June 6, 1961  J. C. LINSENMEYER  2,987,172
FAN ROTOR AND METHOD OF MANUFACTURING SAME
Filed April 22, 1955  2 Sheets-Sheet 1
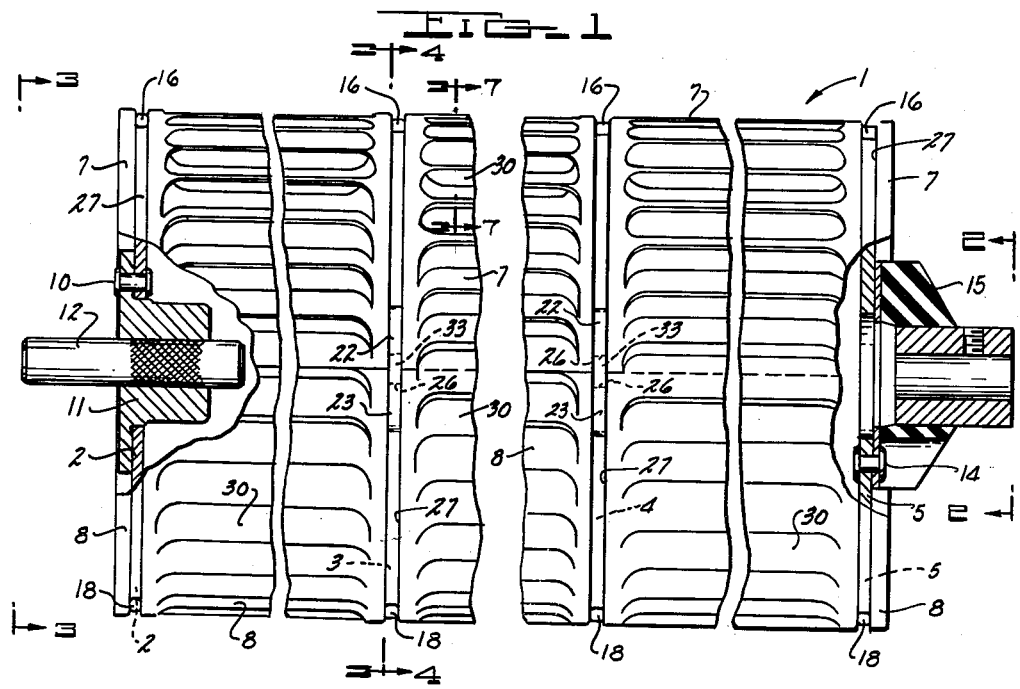
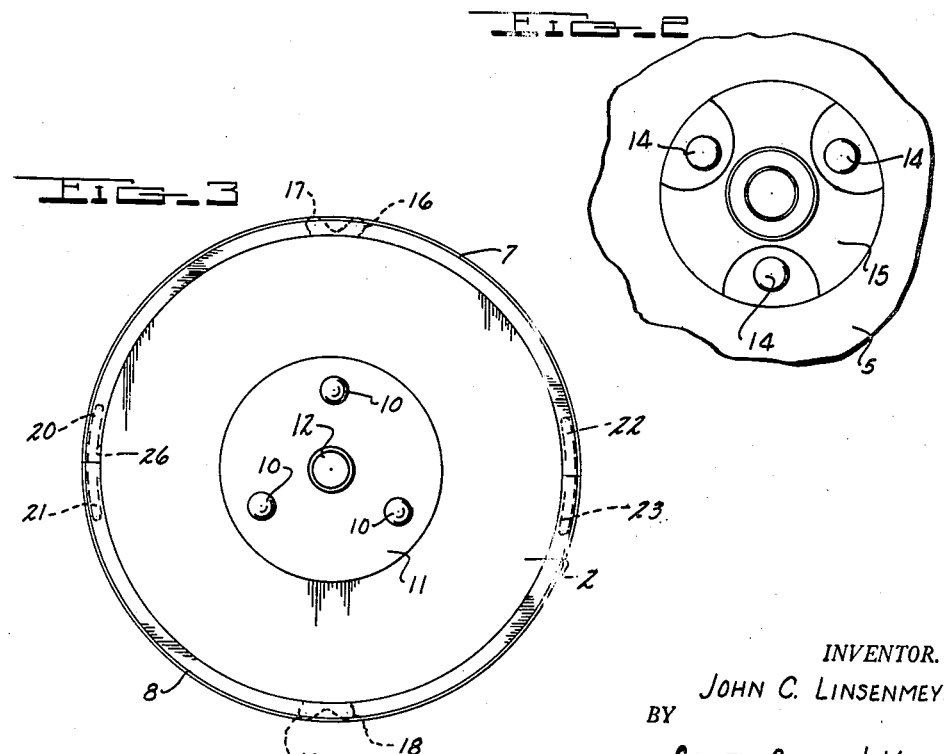
INVENTOR.
JOHN C. LINSENMEYER
BY
SMITH, OLSEN & KOTTS
ATTORNEYS

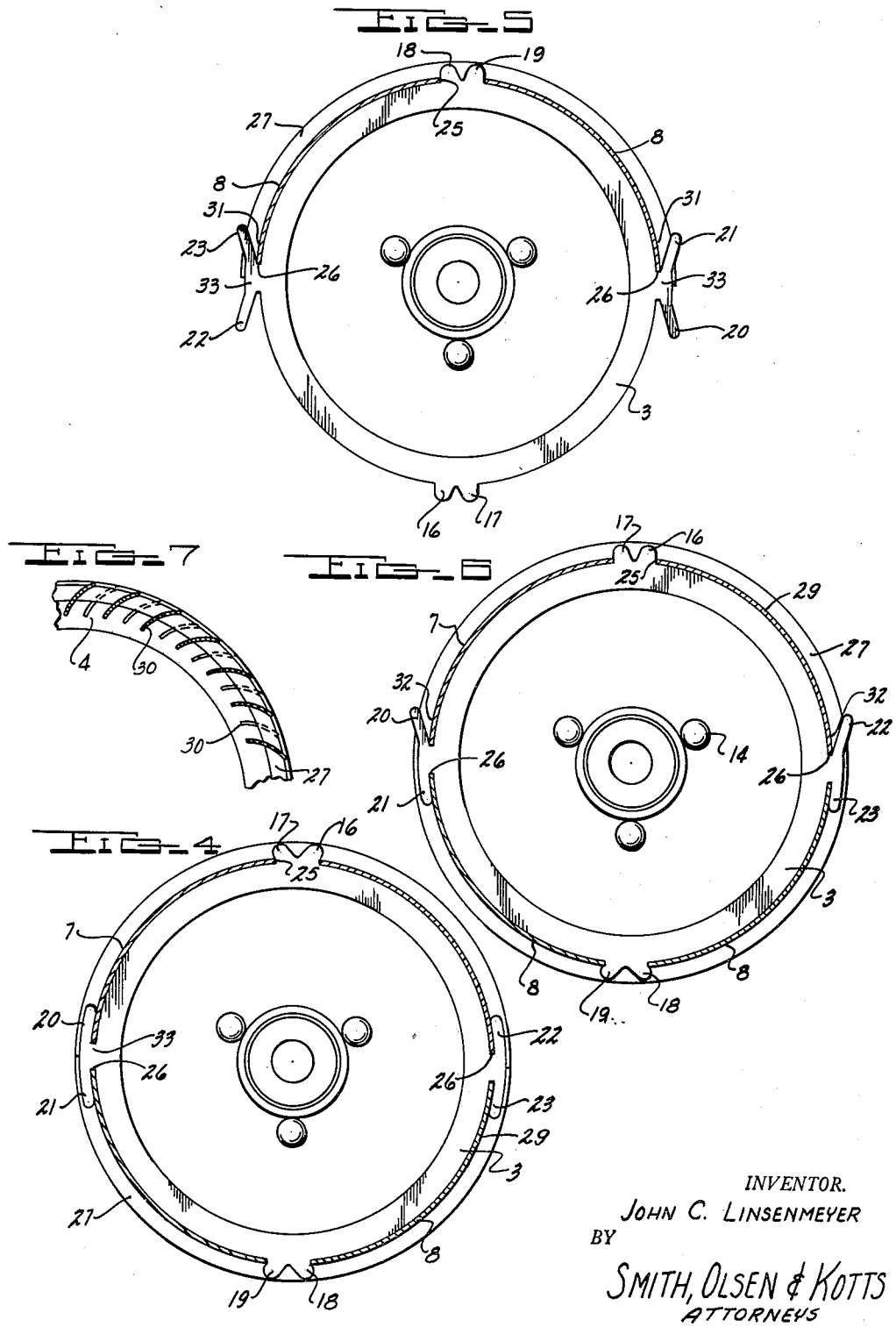

United States Patent Office 2,987,172
Patented June 6, 1961

2,987,172
**FAN ROTOR AND METHOD OF MANUFAC-
TURING SAME**

John C. Linsenmeyer, Grosse Pointe, Mich., assignor, by mesne assignments, to American Radiator & Standard Sanitary Corporation, New York, N.Y., a corporation of Delaware
Filed Apr. 22, 1955, Ser. No. 503,167
9 Claims. (Cl. 230—134)

This invention relates to fan rotors and particularly to the type of fan rotor disclosed in United States Patent No. 1,838,169.

The fan rotor disclosed in said patent comprises generally a long hollow cylinder having formed on the periphery thereof a series of blades. Extending through the cylinder, and fixedly secured to the end plates thereof, is an axially positioned shaft. Rotation of this shaft caused the rotor blades to dig into the fluid in which the rotor is situated and propel it through the rotor in directions at right angles to the rotor axis. The presence of the shaft within the rotor has been found to be disadvantageous both aerodynamically and mechanically.

Aerodynamically the shaft has been found to interfere with efficient flow of fluid through the rotor.

From a mechanical standpoint the extreme length of the shaft (necessitated by the length of the rotor cylinder) causes the shaft to sag near its mid point. As a result the end portions of the shaft vibrate in the shaft bearings, causing power losses, wear on bearing surfaces, and the emission of undesirable sound or noise waves.

It is desirable therefore that the long shaft be eliminated. In place of the long shaft it is desirable to provide two rotor-suspending elements extending outwardly from the rotor end plates. However the extreme length of the rotor makes it necessary to provide mechanism for reinforcing the rotor against distortions. If no reinforcing mechanisms were provided the centrifugal forces to which the rotor is subjected during its operation would cause it to fly apart or explode.

Certain difficulties arise when it is attempted to provide a satisfactory reinforcement mechanism for the rotor and at the same time maintain the cost of constructing the rotor at a commercially competitive value. These difficulties arise in part at least by reason of the structural characteristics which it is necessary to give the completed rotor. For aerodynamic reasons the completed rotor must be "in round" at all points along its length, and the rotor must be in balance at all points around its periphery.

Because the rotor must be reinforced and "in round" there are preferably provided a series of internal reinforcing rings at axially spaced points along the rotor. For reasons of manufacturing economy (as well as for insuring correct blade alignment) it is desirable to form the blades by striking them from a flat sheet and curving the sheet according to the arcuate contour of the finished rotor. A problem arises in securing the reinforcing rings within the blade-forming sheet due to the fact that the inner edges of the blades interfere with insertion of the rings into the circular space defined by the sheet. Even if it were feasible to position the reinforcing rings within a cylindrically formed blade sheet there would still be the problem of securing the rings to the enclosed face of the sheet.

The present invention provides for securement of the blade sheet on the reinforcing rings by designing the blade sheet as a plurality of curved sections and securing the sections individually on the reinforcing rings. In effect the rotor is built around the rings instead of the rings being inserted in the rotor.

In order to provide for proper balance of the rotor the reinforcing rings and blade sheet sections are secured together by means formed integrally with the rings. Such integral formation insures precise dimension and location of the fastening members and thereby obviates imbalance of the rotor caused by varying size rivets or other separately formed fasteners.

Preferably the integrally formed fastening members are the only means employed for securing the blade sheet sections on the reinforcing rings. There are preferably no welding operations employed due to the fact that welding would throw the rotor out of balance and also due to the fact that it is preferred to utilize aluminum as the material for the rotor. The blade sheet sections are of such comparatively thin gauge material and the welding of aluminum is accompanied by such high temperatures that the aluminum is prone to burn through during any welding operation.

One object of the invention is to provide a relatively long fan rotor having desirable aerodynamic characteristics as well as mechanical resistance to distortion-producing forces.

Another object is to provide a relatively long fan rotor without extending a shaft through the rotor interior.

Another object is to provide a fan rotor which will be "in round" at all points along its length.

Another object is to provide a fan rotor which will be in balance at all points around its periphery.

Another object is to provide a fan rotor which requires no welding operations in the assembling together of its parts.

Other objects of this invention will appear in the following description and appended claims, reference being had to the accompanying drawings forming a part of this specification wherein like reference characters designate corresponding parts in the several views.

In the drawings:

FIGURE 1 is an elevational view of a completed rotor constructed according to the invention.

FIGURE 2 is a fragmentary view taken on line 2—2 in FIGURE 1.

FIGURE 3 is a view taken in line 3—3 in FIGURE 1.

FIGURE 4 is a view taken on line 4—4 in FIGURE 1.

FIGURE 5 is a view taken in the same direction as FIGURE 4 but with the rotor in a partially assembled condition.

FIGURE 6 is a view taken in the same direction as FIGURE 5 but with the rotor in a more completely assembled condition.

FIGURE 7 is a view taken on line 7—7 in FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the illustrated embodiment will be seen to include a fan rotor 1 comprised of a series of reinforcing rings 2 through 5 and a plurality of blade sheet sections 7 and 8. Rings 2 and 5, in addition to their function as reinforcing elements, also serve to close the ends of the rotor. As illustrated in FIGS. 4 and 6 rings 3 and 4 are annular or hollow. Ring 2 is imperforate and has fastened thereto a hub 11 by means of rivets 10. A shaft 12 is fixedly secured in hub 11 whereby to mount rotor 1 for rotatable movement about its longitudinal axis.

Ring 5 is imperforate and is provided with a plurality of rivets 14 for fixedly securing thereon a flexible coupling element 15. Rotation of element 15 by a power source (not shown) serves to rotate rotor 1 about the axis defined by elements 12 and 15.

Each of the reinforcing rings 2 through 5 is provided with two sets of tabs 16, 17, 18 and 19 and two sets of ears 20, 21, 22 and 23. These tabs and ears serve to position and secure sheet sections 7 and 8 on the reinforcing rings.

Sections 7 and 8 are each made in dimensions corresponding to one half the circumference of the rotor. Each sheet is provided with a series of inwardly extending stiffener walls 27 of channel shaped configuration, said stiffener walls forming valleys in the exterior surface of the blade sheet and ridges on the interior surface thereof. The webs 29 formed by the stiffener walls are cut through at a plurality of points to provide apertures 25 and other apertures or slots 26. The spaces between adjacent ones of the stiffener walls 27 are struck away from the sheet so as to form a series of blades 30.

Sections 7 and 8 are each formed from flat sheets. These flat sheets are intermittently fed or advanced through a form die which strikes out the blades 30. The stiffener walls 27 and apertures 25, 26 are formed by stamping and punching operations, either before or after blades 30 are formed. Sections 7 and 8 are given their arcuate contours in a form die.

Assembly of the reinforcing rings and blade sheet sections is preferably effected by first positioning reinforcing rings 2 through 5 in parallel spaced relations on a holding jig (not shown). The ring spacing corresponds to the spacing of stiffener walls 27.

Section 8 is then positioned over the spaced rings with the tabs 18 and 19 on each of the rings projecting through apertures 25, and with the ears 21 and 23 on each of the rings overlying wall portions 31 (see FIGURE 5). Neck portions 33 of the ears are seated in slots 26. Securement of section 8 on rings 2 through 5 is effected by spreading apart tabs 18 and 19 so as to frictionally engage the walls of apertures 25, and thereafter rolling ears 21 and 23 into clamping engagement with wall portions 31.

The reinforcing rings and assembled section 8 are then rotated through one hundred eighty radial degrees so as to position tabs 16 and 17 in their uppermost positions shown in FIGURE 6. Section 7 is thereafter positioned on the exposed arcuate faces of the rings with tabs 16, 17 projecting through apertures 25 and with ears 20, 22 overlying wall portions 32. Securement of section 7 on the rings is effected by spreading tabs 16 and 17 apart and rolling ears 20 and 22 into clamping engagement with wall portions 32.

The reinforcing rings 2 through 5 serve not only as reinforcing elements for the rotor but also as mechanisms for ensuring a rotor which is "in round" at all points along the rotor length.

The integral formation of the reinforcing rings and fastener elements 18 through 23 results in uniform fastener element weight and precise location of the fastener elements. As a consequence the rotor is "in balance" at all points about its periphery and assembly costs for the rotor are maintained at a commercially competitive level.

I claim:

1. A fan rotor comprising a plurality of spaced parallel rings having integrally projected therefrom a series of fastener elements, a plurality of arcuate sheets positioned on the rings and having apertures therein in registry with the fastener elements, said sheets having a series of blades integrally projecting therefrom, and said fastener elements being deformed whereby to secure the sheets on the rings.

2. A fan rotor comprising a plurality of spaced parallel rings having integrally projected therefrom a series of ears, a plurality of arcuate blade sheets positioned on the rings and having slots in their edge portions, said ears having neck portions seated in the slots and body portions rolled down into clamping engagement with the outer surfaces of the sheets.

3. A method of forming a fan rotor comprising the steps of forming a plurality of sheets with a series of projecting blades, providing a plurality of rings with projecting ears and tabs, positioning the rings in parallel spaced relations, providing openings in body portions of the sheets, providing slots in edge portions of the sheets, bending portions of the sheets in the areas of the slots and openings to form U-shaped valleys in one surface of each sheet and U-shaped ridges in the other surface of each sheet, positioning the ridge web portions of one of the sheets on the rings with tabs projecting through the openings and with ears projecting through the slots into positions overlying the valley-forming portions of one sheet, spreading the projected through tabs and rolling down the projected through ears into the valleys to secure the one sheet on the rings, positioning ridge portions of a second of the sheets on unenclosed portions of the rings with tabs and ears thereof projecting through the openings and slots in the second sheet, and spreading the last named tabs and rolling down the last named ears into the valleys whereby to secure the second sheet on the rings.

4. A fan rotor comprising a plurality of spaced parallel rings; a plurality of contiguous arcuate blade sheets having channel shaped stiffener walls formed integrally therewith so as to provide web-forming ridges on their concave surfaces and valleys on their convex surfaces; said sheets being positioned on the rings with the webs of the ridges engaged with peripheral surfaces of the rings; and fastener elements integrally formed with the rings and extending through said webs into clamping engagement with the valley-forming surfaces of the sheets.

5. The combination of claim 4 wherein slots are formed in end portions of the aforementioned webs, and at least certain of the fastener elements include ears having neck portions within said slot sand body portions clampingly engaging exterior face portions of the webs.

6. A fan rotor comprising two parallel end rings and at least one other parallel ring positioned therebetween; the end rings being closed and the intermediate ring being hollow; each of the rings having integrally projected therefrom a series of fastener elements; a plurality of contiguous blade sheets positioned on the rings and having apertures in registry with the fastener elements, said fastener elements being deformed whereby to secure the sheets on the rings; and spaced axially directed support members projecting from the end rings, whereby the interior of the rotor is devoid of rotor support structure.

7. A fan rotor comprising a plurality of spaced parallel rings; arcuate blade sheet means having channel shaped stiffener walls formed integrally therewith so as to provide web-forming ridges on the concave surface and valleys on the convex surface; the webs of the ridges being engaged with peripheral surfaces of the rings; and fastener elements integrally formed with the rings and extending through said webs into clamping engagement with the valley-forming surfaces.

8. The combination of claim 7 wherein at least one of the fastener elements includes two closely positioned tabs extending through a single opening in the blade sheet means, said tabs being spread away from one another to clampingly engage the valley-forming surfaces; the radial thickness of tab material outside of the slots being substantially greater than the thickness of the sheets whereby to offer substantial resistance to tab breakage.

9. A fan rotor comprising a plurality of spaced parallel rings having a series of outwardly projecting neck portions integrally formed therewith; a plurality of arcuate segmental blade sheets positioned around the periphery of said rings to define a series of blade sheet edges extending parallel to the rotor axis; each of said blade sheet edges having slots therein receiving the aforementioned neck portions; each neck portion having a pair of oppositely directed ear portions integrally extending therefrom in clamping relation to the outer surface of the adjacent sheet.

References Cited in the file of this patent

UNITED STATES PATENTS

| | | |
|---|---|---|
| 2,231,063 | Evans | Feb. 11, 1941 |
| 2,302,095 | Bartch | Nov. 17, 1942 |
| 2,315,407 | Evans | Mar. 30, 1943 |
| 2,431,647 | Mayne et al. | Nov. 25, 1947 |
| 2,496,179 | Schawarz | Jan. 31, 1950 |
| 2,628,419 | Wilken | Feb. 17, 1953 |
| 2,684,521 | Morrison | July 27, 1954 |

FOREIGN PATENTS

| | | |
|---|---|---|
| 273,201 | Germany | Apr. 21, 1914 |